Patented May 31, 1927.

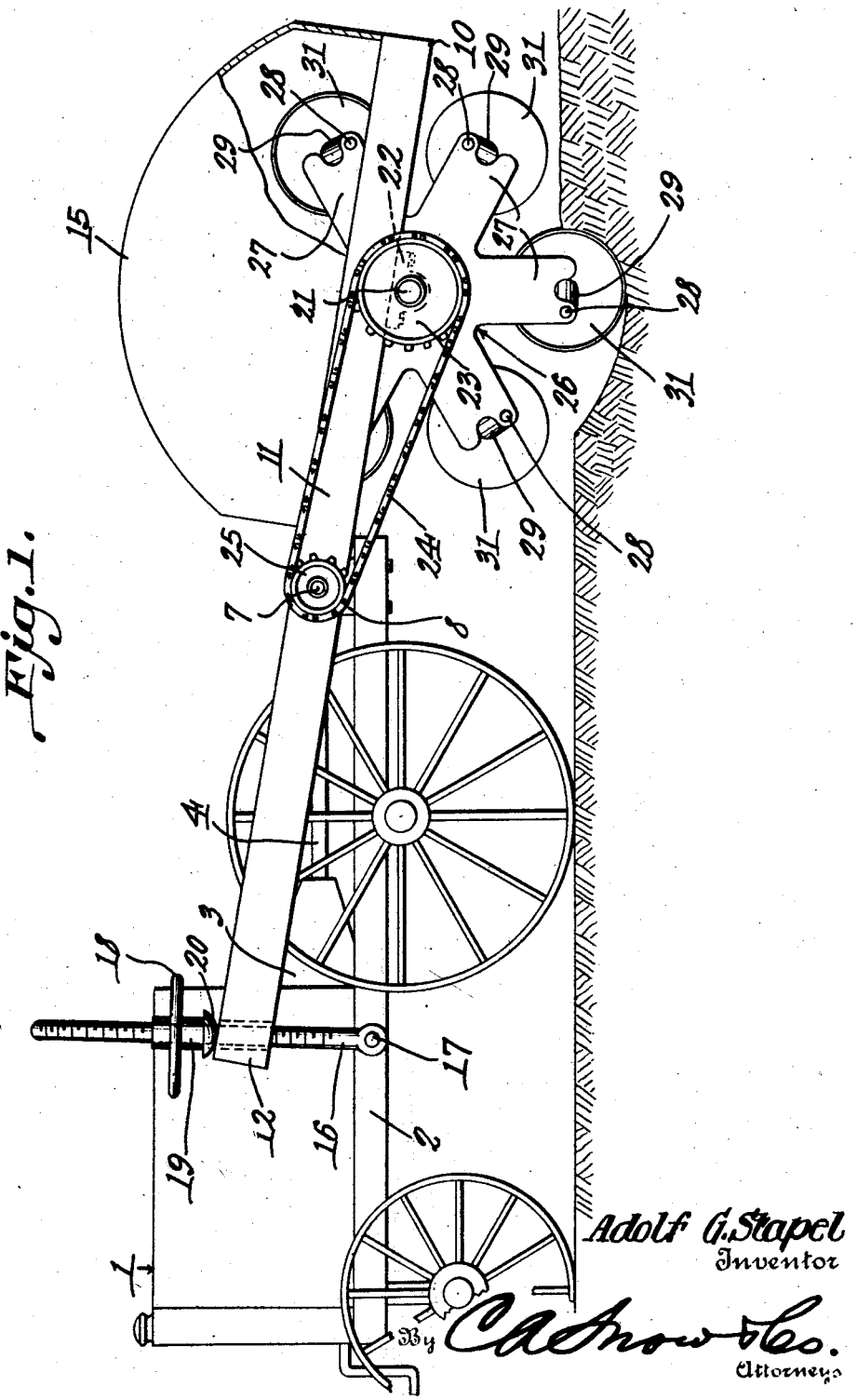

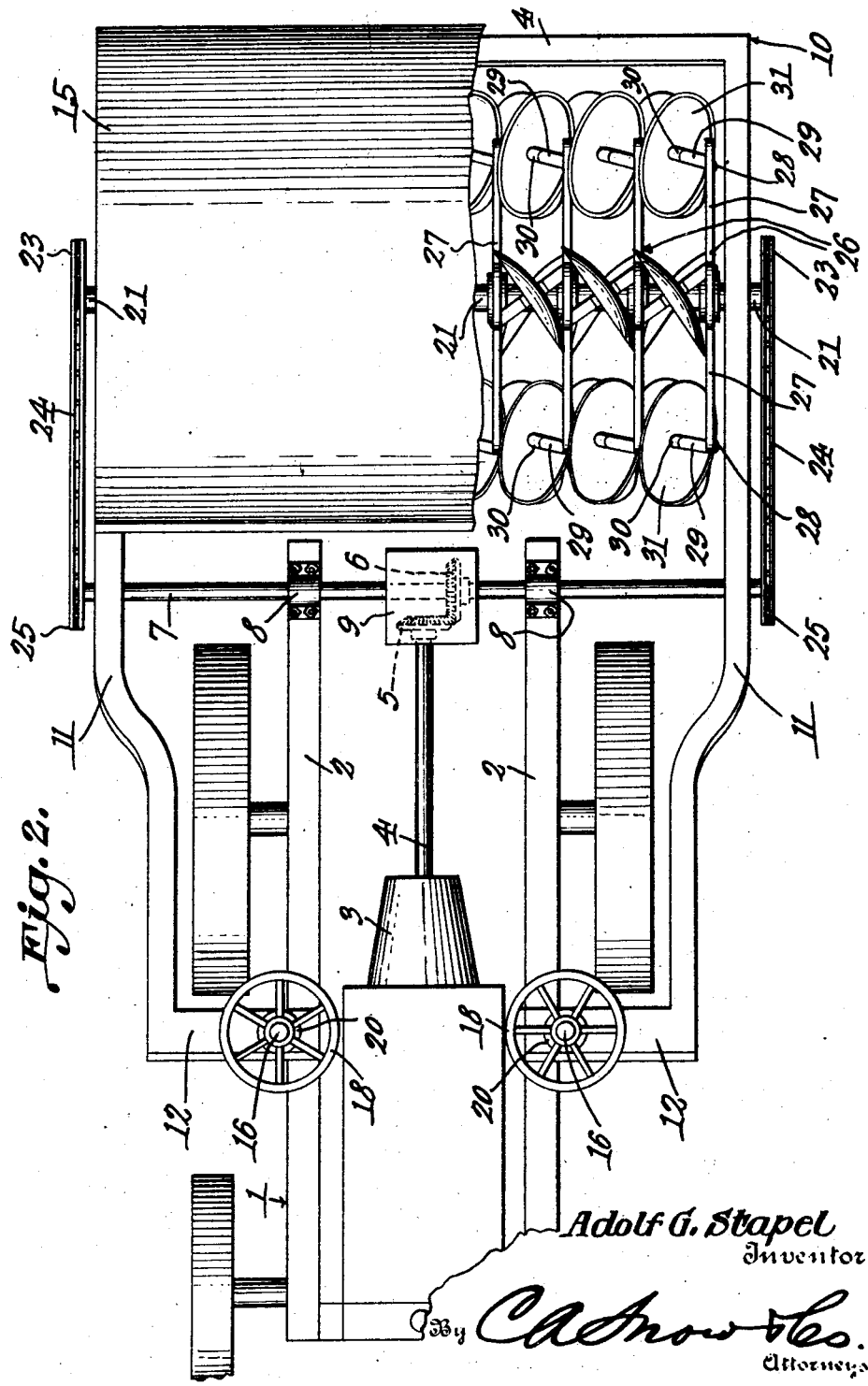

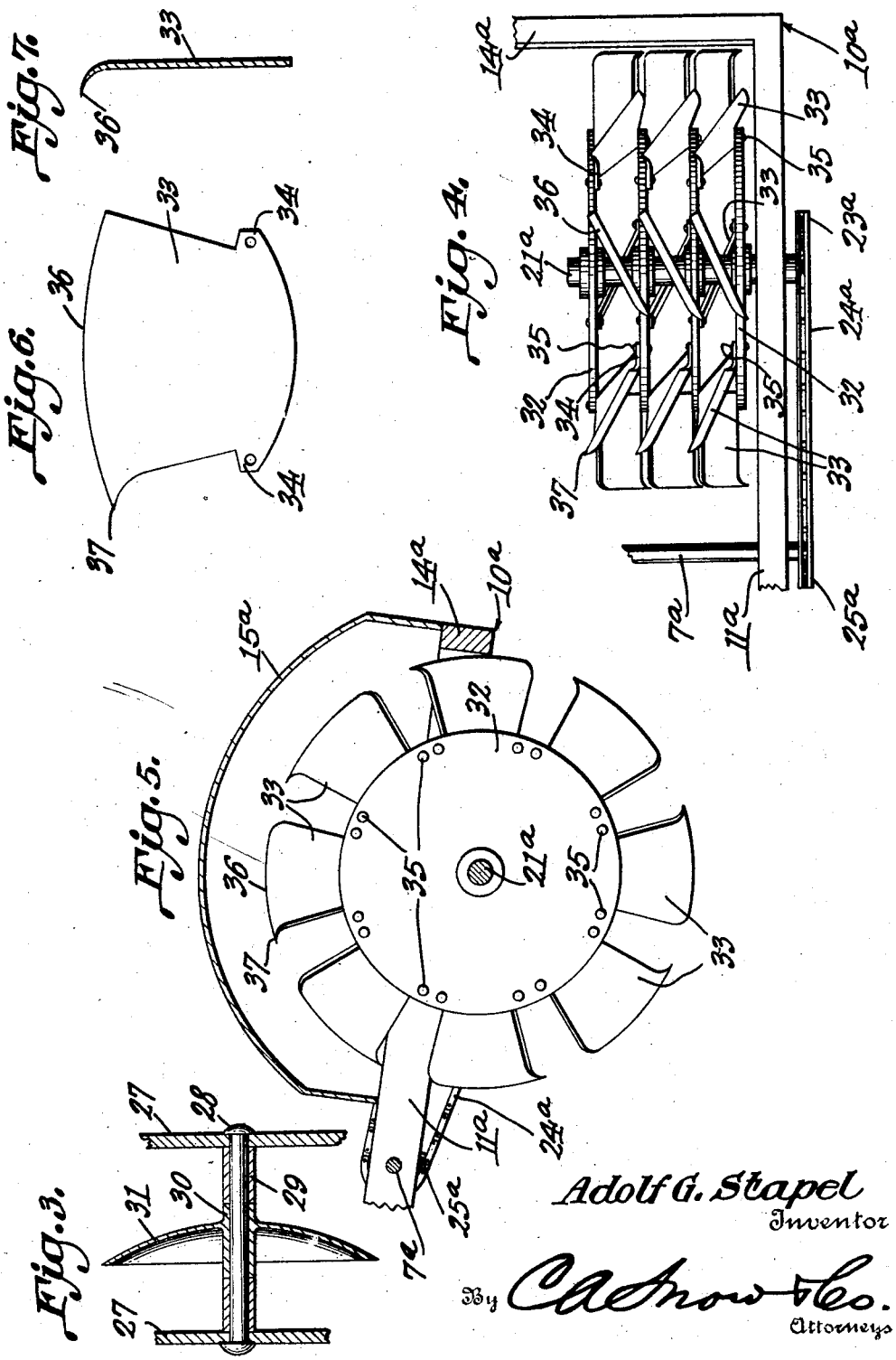

1,631,075

UNITED STATES PATENT OFFICE.

ADOLF G. STAPEL, OF MONTGOMERY, ALABAMA.

ROTARY PLOW.

Application filed November 20, 1925. Serial No. 70,269.

It is the object of this invention to provide a novel rotary soil-engaging element for a tilling machine.

In the drawings:—

Figure 1 shows in side elevation, a device constructed in accordance with the invention, parts being in section;

Figure 2 is a top plan wherein parts have been broken away and removed;

Figure 3 is a sectional view taken through the mounting for the discs;

Figure 4 is a fragmental top plan showing a modification;

Figure 5 is a vertical section taken through the structure delineated in Figure 4;

Figure 6 is an elevation showing one of the blades used in Figures 4 and 5;

Figure 7 is a section of the blade depicted in Figure 6.

In carrying out the invention, there is provided a vehicle 1 which may be of any desired construction, and be propelled in any desired way. Preferably, the vehicle 1 is wheel-mounted and of the tractor type. The vehicle includes side bars 2 and an engine 3, the shaft 4 of which extends longitudinally of the vehicle and carries at its rear end a beveled pinion 5 meshing with a beveled pinion 6 mounted on the intermediate portion of a transverse driven shaft 7 journaled in bearings 8 on the side bars 2 of the vehicle 1. For the purpose of covering the soil-engaging elements (hereinafter described) a hood 15 may be mounted on a frame 10 including side bars 11 equipped at their forward ends with inwardly extended arms 12, the side bars 11 being connected at their rear ends by a cross piece 14. The intermeshing beveled pinions 5 and 6 may be covered by a housing 9 mounted on the shafts 4 and 7. The side bars 11 of the frame 10 are mounted pivotally, intermediate their ends, on the shaft 7 and are located outwardly of the side bars 2 of the vehicle 1, the frame 10, therefore, being mounted for swinging adjustment, vertically, on the vehicle 1.

An adjusting mechanism for holding the frame 10 at different angles is provided, and this mechanism may be of any desired form. As shown, but not of necessity, screws 16 extend upwardly through enlarged openings in the forward ends of the side bars 11 of the frame 10, the screws being pivoted at 17, at their lower ends, upon the side bars 2 of the vehicle 1. Hand wheels 18 are threaded upon the screws 16, and the depending hubs 19 of the hand wheels have rounded feet 20, bearing upon the upper edges of the side bars 11 of the frame 10 at the forward end of the frame. Obviously, by rotating the hand wheels 18, the hand wheels will travel along the screws 16, and cause a raising or lowering of the rear end of the frame 10 with respect to the surface of the soil.

A transverse axle 21 is journaled for rotation in bearings 22 mounted on the side bars 11 of the frame 10 and located considerably to the rear of the driven shaft 7. On the ends of the axle 21, there are sprocket wheels 23 engaged by sprocket chains 24 cooperating with sprocket wheels 25 on the ends of the shaft 7.

Heads 26 are mounted on the axle 21, between the side bars 11, and have radial arms 27 connected by inclined shafts 28 carrying spacers 29 between which are located the hubs 30 of soil-engaging elements, such as concaved disks 31, the disks 31 being journaled on the supports or shafts 28. The disks 31 are disposed in rows carried by the rotor 32—21 of the plow, the disks of all of the rows being disposed at an acute angle to the draft line, and at an acute angle to the vertical, the disks of adjoining rows slanting in opposite directions, both with respect to the draft line and with respect to the vertical.

In Figures 5, 6, 7 and 4, parts hereinbefore described are designated by numerals previously used, with the suffix "a". The heads 32 on the axle 21$^a$ are in the form of disks, and blades 33 replace the disks 31, the blades 33 having ears 34 turned into parallelism with the heads 32 and connected therewith by securing elements 35, the working edges of the blades 33 being laterally curved or inclined, as shown at 36, and each blade having a point 37. The blades 33 are disposed with respect to the surface of the soil, and with respect to the draft line, as hereinbefore described in connection with the disks 31.

In practical operation, when the engine 3 is operated, the shaft 4 will drive the shaft 7 through the instrumentality of the intermeshing beveled pinions 5 and 6, the sprocket wheels 25, the shafts 24, and the sprocket wheels 23 imparting rotation to the axle 21, the rotor of the plow being operated, the disks 31 being carried around in an orbit, and rotating, also, on axes represented by the parts 28.

The construction of the device is such that, although the frame 10 may be tilted for adjustment, through the instrumentality of the screws 16 and the hand wheels 18, the driving train between the shaft 7 and the axle 21 will not be interfered with, that train embodying the sprocket wheels 25, the shafts 24, and the sprocket wheels 23. Since the screws 16 are not threaded into the side bars 11 of the frame 10, the rear end of the frame can rise or lower, to let the rotor pass over obstructions, for instance, when the disks 31 strike a root or rock. Owing to the way in which the disks 31 of the rows are set with respect to each other, side draft will be eliminated. When one row of disks is entering the soil, the next adjoining row is in the soil, and, thus, side slipping of the machine, when in operation, is impossible.

The disks 31 are so set as to cut the soil slanting and with a rolling motion, around an axis represented by the support or shaft 28 of Figure 3. The entire rotor is turned by the engine or motor 3, and the disks 31, therefore, have a compound movement, one element of which is a movement in an orbit represented by the axle 21, and the other of which is a rotation about the shaft or support 28. When an ordinary disk plow is being operated, the disks of such a plow move forward in a straight line. In the device forming the subject matter of this application, the emotion or travel of the disk 31 is not merely in a straight line, but is of the compound form hereinbefore described. The width of the furrow slice depends upon the lineal speed of advance, considered relatively to the speed of rotation of the rotor, which carries the disks 31 or the blades 33. Owing to the particular way in which the disks operate with respect to the soil, the loose soil is cleared out of the way and does not interfere, when the next adjoining row of disks comes down to enter the untilled soil. It will be observed that there may be as many of the disks 31 or as many of the blades 33, in each row, as may be desired, and, in general, such alterations as are desired may be made, within the scope of what is claimed, without departing from the spirit of the invention. For instance, the rotary plow described may be assembled with a vehicle which is constructed differently from the vehicle delineated in the drawings.

One of the main improvements contemplated by the invention is in the general arrangement of parts, which form a combination adapted to produce new and valuable results. The soil is cut up and pulverized better than with implements heretofore known, and the device forming the subject matter of this application will operate expeditiously, and with economy. The cost of tilling land will be reduced, and the time required for the plowing of a specified area will be cut down greatly.

What is claimed is:—

1. In a rotary soil-engaging element, a shaft, webs carried by the shaft, soil-engaging elements extended between the webs, the soil-engaging elements being disposed in rows, the soil-engaging elements of all of the rows being disposed at an acute angle to the draft line and at an acute angle to the vertical, and the soil-engaging elements of adjoining rows slanting in opposite directions both with respect to the draft line and with respect to the vertical.

2. A device of the class described, constructed as set forth in claim 1, and further characterized by the fact that the rows of soil-engaging elements are journaled on the webs for turning movement about independent axes.

In testimony that I claim the foregoing as my own, I have hereto affixed my signature.

ADOLF G. STAPEL.